United States Patent [19]

Kulprathipanja et al.

[11] 4,372,876

[45] Feb. 8, 1983

[54] ZEOLITE MOLECULAR SIEVE ADSORBENT FOR AN AQUEOUS SYSTEM

[75] Inventors: Santi Kulprathipanja, Hoffman Estates; Richard W. Neuzil, Downers Grove, both of Ill.

[73] Assignee: UOP Inc., Des Plaines, Ill.

[21] Appl. No.: 353,683

[22] Filed: Mar. 1, 1982

Related U.S. Application Data

[60] Division of Ser. No. 217,946, Dec. 18, 1980, Pat. No. 4,333,769, which is a continuation-in-part of Ser. No. 146,533, May 2, 1980, Pat. No. 4,319,928.

[51] Int. Cl.³ .............................................. B01J 20/18
[52] U.S. Cl. .................................. 252/430; 252/455 Z
[58] Field of Search ..................... 127/46, 46.1, 46.2; 210/673, 679, 691; 252/430, 455 Z

[56] References Cited

U.S. PATENT DOCUMENTS 4,248,737  2/1981  Kulprathipanja .................. 127/46.1
4,295,994  10/1981  Kulprathipanja .................. 127/46.1

*Primary Examiner*—Ivars C. Cintins

*Attorney, Agent, or Firm*—James R. Hoatson, Jr.; Louis A. Morris; William H. Page II

[57] ABSTRACT

An improved adsorbent comprising a crystalline aluminosilicate, method of manufacture of the adsorbent and improved process for separating a component from a feed mixture comprising an aqueous solution of a mixture of different components, such as a mixture of saccharides. In the process the mixture is contacted with the adsorbent, which selectively adsorbs a component from the feed mixture. The adsorbed component is then recovered by contacting the adsorbent with a desorbent material such as water to effect the desorption of the adsorbed component from the adsorbent. There is an undesirable tendency for the silicon constituent of the crystalline aluminosilicate to dissolve in the aqueous system. The improvement to the adsorbent and process comprises the coating of the adsorbent with ethylcellulose which substantially reduces the undeirable dissolution. The adsorbent is manufactured by mixing together the uncoated precursor of the adsorbent with the organic polymer dissolved in a liquid organic solvent, and removing the solvent.

15 Claims, No Drawings

ZEOLITE MOLECULAR SIEVE ADSORBENT FOR AN AQUEOUS SYSTEM

CROSS REFERENCE TO RELATED APPLICATIONS

This application is a division of our prior co-pending application Ser. No. 217,946 filed Dec. 18, 1980, now U.S. Pat. No. 4,333,769, which was a continuation-in-part of our prior co-pending application Ser. No. 146,533 filed May 2, 1980 which issued as U.S. Pat. No. 4,319,928, both prior applications incorporated herein by reference.

BACKGROUND OF THE INVENTION

1. Field of the Invention

The field of art to which this invention pertains is solid bed adsorptive separation. More specifically, the invention relates to an improved adsorbent, method of manufacture of the adsorbent and improved process for separating a component from a mixture comprising an aqueous solution of a mixture of different components which process employs an adsorbent comprising a crystalline aluminosilicate which selectively adsorbs a component from the feed mixture.

2. Prior Art

It is known in the separation art that certain crystalline aluminosilicates referred to as zeolites can be used in the separation of a component from an aqueous solution of a mixture of different components. For example, adsorbents comprising aluminosilicate are used in the method described in U.S. Pat. No. 4,014,711 to separate fructose from a mixture of sugars in aqueous solution including fructose and glucose.

It is also known that crystalline aluminosilicates or zeolites are used in adsorption processing in the form of agglomerates having high physical strength and attrition resistance. Methods for forming the crystalline powders into such agglomerates include the addition of an inorganic binder, generally a clay comprising silicon dioxide and aluminum oxide to the high purity zeolite powder in wet mixture. The blended clay zeolite mixture is extruded into cylindrical type pellets or formed into beads which are subsequently calcined in order to convert the clay to an amorphous binder of considerable mechanical strength. As binders, clays of the kaolin type are generally used. It is also known that water permeable organic polymers are superior binders.

Zeolitic crystal and inorganic binder agglomerates have long been known to have the property of gradually disintegrating as a result of continuous contact with water. This disintegration has been observed as a silicon presence or contamination in the solution in contact with the adsorbent. Such contamination may at times be sufficiently severe to impart a cloudy appearance to the solution. Water permeable organic polymer binders are known to substantially lessen this property.

We have discovered an improved inorganic matrix adsorbent, a method of manufacturing the adsorbent and an improvement to an aqueous separation process which minimizes the disintegration of the adsorbent and silicon contamination of the product.

SUMMARY OF THE INVENTION

Accordingly, the objectives of our invention are (1) to provide an improvement to a process for the separation of a component from a feed mixture comprising different components in aqueous solution by contacting said mixture with an adsorbent comprising a crystalline aluminosilicate so as to minimize the dissolution of the crystalline aluminosilicate and silica contamination of the product; (2) to develop an adsorbent composition suitable for use in the process of the first stated objective; and (3) to provide a method of manufacture of such adsorbent.

In brief summary, our invention is, in one embodiment, an improved process for the separation of a component from a feed mixture comprising an aqueous solution of a mixture of components by contacting the solution with an adsorbent comprising a crystalline aluminosilicate dispersed in an inorganic matrix exhibiting an adsorptive selectivity towards the component. The component is thereby selectively adsorbed from the mixture, and thereafter recovered. The silicon constituent of the adsorbent tends to dissolve in the solution resulting in the undesirable disintegration of the adsorbent. The improvement to the process comprises the coating of the adsorbent with ethyl cellulose which substantially reduces the extent of dissolution of the silicon constituent and the extent of the disintegration of the adsorbent.

In another embodiment, our invention is an adsorbent comprising a crystalline aluminosilicate dispersed in an inorganic matrix suitable for use in a process for the separation of a component from a feed mixture comprising an aqueous solution of a mixture of components by contacting the solution with the adsorbent. The silicon constituent of the adsorbent tends to dissolve in the solution resulting in the undesirable disintegration of the crystalline aluminosilicate. The improvement to the adsorbent comprises the coating of the adsorbent with ethyl cellulose which incorporation substantially reduces the extent of dissolution of the silicon constituent and the extent of the disintegration of the adsorbent.

In still another embodiment, our invention is a method for the manufacture of an adsorbent comprising crystalline aluminosilicate dispersed in an inorganic matrix and coated with ethyl cellulose suitable for use in a process for the separation of a component from a feed mixture comprising an aqueous solution of a mixture of components. The method comprises: (a) dissolving the ethyl cellulose in a liquid organic solvent to form a solution; (b) adding the uncoated precursor of said adsorbent to the solution to form an adsorbent slurry; and (c) removing the solvent from the adsorbent slurry to obtain the adsorbent.

Other objects and embodiments of our invention encompass details about feed mixtures, adsorbents, binder materials, solvents, desorbent material and operating conditions, all of which are hereinafter disclosed in the following discussions of each of the facets of the present invention.

DESCRIPTION OF THE INVENTION

At the outset of definitions of various terms used throughout the specification will be useful in making clear the operation, objects and advantages of our process.

A feed mixture is a mixture containing one or more extract components and one or more raffinate components to be separated by our process. The term "feed stream" indicates a stream of a feed mixture which passes to the adsorbent used in the process.

An "extract component" is a component that is more selectively adsorbed by the adsorbent while a "raffinate component" is a component that is less selectively adsorbed. The term "desorbent material" shall mean generally a material capable of desorbing an extract component. The term "desorbent stream" or "desorbent input stream" indicates the stream through which desorbent material passes to the adsorbent. The term "raffinate stream" or "raffinate output stream" means a stream through which a raffinate component is removed from the adsorbent. The composition of the raffinate stream can vary from essentially 100% desorbent material to essentially 100% raffinate components. The term "extract stream" or "extract output stream" shall mean a stream through which an extract material which has been desorbed by a desorbent material is removed from the adsorbent. The composition of the extract stream, likewise, can vary from essentially 100% desorbent material to essentially 100% extract components. At least a portion of the extract stream, and preferably at least a portion of the raffinate stream, from the separation process are passed to separation means, typically fractionators or evaporators, where at least a portion of desorbent material is separated to produce an extract product and a raffinate product. The term "extract product" and "raffinate product" mean products produced by the process containing, respectively, an extract component and a raffinate component in higher concentrations than those found in the extract stream and the raffinate stream.

The term "selective pore volume" of the adsorbent is defined as the volume of the adsorbent which selectively adsorbs an extract component from the feed mixture. The term "non-selective void volume" of the adsorbent is the volume of the adsorbent which does not selectively retain an extract component from the feed mixture. This volume includes the cavities of the adsorbent which contain no adsorptive sites and the interstitial void spaces between adsorbent particles. The selective pore volume and the non-selective void volume are generally expressed in volumetric quantities and are of importance in determining the proper flow rates of fluid required to be passed into an operational zone for efficient operations to take place for a given quantity of adsorbent. When adsorbent "passes" into an operational zone (hereinafter defined and described) employed in one embodiment of this process, its non-selective void volume, together with its selective pore volume, carries fluid into that zone. The non-selective void volume is utilized in determining the amount of fluid which should pass into the same zone in a countercurrent direction to the adsorbent to displace the fluid present in the non-selective void volume. If the fluid flow rate passing into a zone is smaller than the non-selective void volume rate of adsorbent material passing into that zone, there is a net entrainment of liquid into the zone by the adsorbent. Since this net entrainment is a fluid present in non-selective void volume of the adsorbent, it, in most instances, comprises less selectively retained feed components. The selective pore volume of an adsorbent can in certain instances adsorb portions of raffinate material from the fluid surrounding the adsorbent, since in certain instances there is competition between extract material and raffinate material for adsorptive sites within the selective pore volume. If a large quantity of raffinate material with respect to extract material surrounds the adsorbent, raffinate material can be competitive enough to be adsorbed by the adsorbent.

The so-called "simple sugars" are classified as monosaccharides and are those which upon hydrolysis do not break down into smaller simpler sugars. One may further classify monosaccharides as aldoses or ketoses, depending upon whether they are hydroxy aldehydes or hydroxy ketones, and by the number of carbon atoms in the molecule. Most common and well-known are probably the hexoses. Common ketohexoses are fructose (levulose) and sorbose; common aldohexoses are glucose (dextrose) mannose and galactose. The term "oligosaccharides", as commonly understood in the art and as used herein, means simple polysaccharides containing a known number of constituent monosaccharide units. An oligosaccharide that breaks up upon hydrolysis into two monosaccharide units is called a disaccharide, examples being sucrose, maltose, and lactose. Those giving three such units are trisaccharides, of which raffinose and melezitose are examples. Di-, tri- and tetrasaccharides comprise practically all of the oligosaccharides. The term "polysaccharide" includes oligosaccharides but usually it refers to carbohydrate materials of much higher molecular weight, namely, those that are capable of breaking up on hydrolysis into a large number of monosaccharide units. Typical polysaccharides are starch, glycogen, cellulose and pentosans.

Feed mixtures which can be charged to the process of our invention may, for example, be aqueous solutions of one or more aldoses and one or more ketoses, or one or more monosaccharides and one or more oligosaccharides. The concentration of solids in the solutions may range from about 0.5 wt. % to about 50 wt. % or more, but preferably will be from about 5 to about 35 wt. %. Starch syrups such as corn syrup are examples of feed mixtures which can be charged to our process. Such syrups are produced by the partial hydrolysis of starch generally in the presence of mineral acids or enzymes. Corn syrup produced in this manner will typically contain 25 to 75 wt. % solids comprising 90 to 95% glucose and 5 to 10% maltose and higher oligosaccharides. A portion of the glucose in this corn syrup may be isomerized with an isomerizing enzyme to produce a high fructose corn syrup, typically comprising 40 to 45% fructose, 50 to 55% glucose and 5 to 10% oligosaccharides, which can also be charged to our process. The pH of the aqueous solution comprising the feed mixture may be from about 5.0 to about 8.0.

Desorbent materials used in various prior art adsorptive separation processes vary depending upon such factors as the type of operation employed. In the swing bed system, in which the selectively adsorbed feed component is removed from the adsorbent by a purge stream, desorbent selection is not as critical and desorbent material comprising gaseous hydrocarbons such as methane, ethane, etc., or other types of gases such as nitrogen or hydrogen, may be used at evaporated temperatures or reduced pressures or both to effectively purge the adsorbed feed component from the adsorbent. However, in adsorptive separation processes which are generally operated continuously at substantially constant pressures and temperatures to insure liquid phase, the desorbent material must be judiciously selected to satisfy many criteria. First, the desorbent material should displace an extract component from the adsorbent with reasonable mass flow rates without itself being so strongly adsorbed as to unduly prevent an extract component from displacing the desorbent material in a following adsorption cycle. Expressed in terms of the selectivity (hereinafter discussed in more detail), it is preferred that the adsorbent be more selective for all of the extract components with respect to a raffinate component than it is for the desorbent material with respect to a raffinate component. Secondly, desorbent material must be compatible with the particular adsorbent and the particular feed mixture. More specifically, they must not reduce or destroy the critical selectivity of the adsorbent for an extract component with respect to a raffinate component. Additionally, desorbent materials should not chemically react with or cause a chemical reaction of either an extract component or a raffinate component. Both the extract stream and the raffinate stream are typically removed from the adsorbent in admixture with desorbent material and any chemical reaction involving a desorbent material and an extract component or a raffinate component would reduce the purity of the extract product or the raffinate product or both. Since both the raffinate stream and the extract stream typically contain desorbent material, desorbent materials should additionally be substances which are easily separable from the feed mixture that is passed into the process. Without a method of separating at least a portion of the desorbent material present in the extract stream and the raffinate stream, the concentration of an extract component in the extract product and the concentration of a raffinate component in the raffinate product would not be very high, nor would the desorbent material be available for reuse in the process. It is contemplated that at least a portion of the desorbent material will be separated from the extract and the raffinate streams by distillation or evaporation, but other separation methods such as reverse osmosis may also be employed alone or in combination with distillation or evaporation. Since the raffinate and extract products are foodstuffs intended for human consumption, desorbent material should also be non-toxic. Finally, desorbent materials should also be materials which are readily available and therefore reasonable in cost.

We have observed that water having a pH of from about 5.0 to about 8.0 satisfies these criteria and is a suitable and preferred desorbent material for our process. The pH of the desorbent material is important because adsorption of a component by the adsorbent, removal of a raffinate stream, desorption of the component from the adsorbent and removal of an extract stream all typically occur in the presence of desorbent material. If the desorbent material is too acidic or too alkaline, chemical reactions of the components are promoted and reaction products are produced that can reduce the yield purity of either the extract or raffinate product, or both.

Water pH does of course vary widely depending upon the source of the water in addition to other factors. Methods of maintaining and controlling a desired water pH are, however, well-known to those skilled in the art of water treating. Such methods generally comprise adding an alkaline compound such as sodium hydroxide or an acid compound such as hydrochloric acid to the water in amounts as necessary to achieve and maintain the desired pH.

The prior art has recognized that certain characteristics of adsorbents are highly desirable, if not absolutely necessary, to the successful operation of a selective adsorption process. Such characteristics are equally important to this process. Among such characteristics are: adsorptive capacity for some volume of an extract component per volume of adsorbent; the selective adsorption of an extract component with respect to a raffinate component and the desorbent material; and sufficiently fast rates of adsorption and desorption of an extract component to and from the adsorbent. Capacity of the adsorbent for adsorbing a specific volume of an extract component is, of course, a necessity; without such capacity the adsorbent is useless for adsorptive separation. Furthermore, the higher the adsorbent's capacity for an extract component the better is the adsorbent. Increased capacity of a particular adsorbent makes it possible to reduce the amount of adsorbent needed to separate an extract component of known concentration contained in a particular charge rate of feed mixture. A reduction in the amount of adsorbent required for a specific adsorptive separation reduces the cost of the separation process. It is important that the good initial capacity of the adsorbent be maintained during actual use in the separation process over some economically desirable life. The second necessary adsorbent characteristic is the ability of the adsorbent to separate components of the feed; or, in other words, that the adsorbent possess adsorptive selectivity (B), for one component as compared to another component. Relative selectivity can be expressed not only for one feed component as compared to another but can also be expressed between any feed mixture component and the desorbent material. The selectivity (B), as used throughout this specification is defined as the ratio of the two components of the adsorbed phase over the ratio of the same two components in the unadsorbed phase at equilibrium conditions. Relative selectivity is shown as Equation 1, below:

EQUATION 1

$$\text{Selectivity} = (B) = \frac{[\text{vol. percent } C/\text{vol. percent } D]_A}{[\text{vol. percent } C/\text{vol. percent } D]_U}$$

where C and D are two components of the feed represented in volume percent and the subscripts A and U represent the adsorbed and unadsorbed phases respectively. The equilibrium conditions were determined when the feed passing over a bed of adsorbent did not change composition after contacting the bed of adsorbent. In other words, there was no net transfer of material occurring between the unadsorbed and adsorbed phases. Where selectivity of two components approaches 1.0 there is no preferential adsorption of one component by the absorbent with respect to the other; they are both adsorbed (or non-adsorbed) to about the same degree with respect to each other. As the (B) becomes less than or greater than 1.0 there is a preferential adsorption by the adsorption for one component with respect to the other. When comparing the selectivity by the adsorbent of one component C over component D, a (B) larger than 1.0 indicates preferential adsorption of component C within the adsorbent. A (B) less than 1.0 would indicate that component D is preferentially adsorbed leaving an unadsorbed phase richer in component C and an adsorbed phase richer in component D. Ideally, desorbent materials should have a selectivity equal to about 1 or slightly less than 1 with respect to all extract components s that all of the extract components can be desorbed as a class with reasonable flow rates of desorbent material and so that extract components can displace desorbent material in a subsequent adsorption step. While separation of an extract component from a raffinate component is theoretically possible when the selectivity of the adsorbent for the extract component with respect to the raffinate component is greater than 1.0, it is preferred that such selectivity be greater than 1.0. Like relative volatility, the higher the selectivity the easier the separation is to perform. High selectivities permit a smaller amount of adsorbent to be used. The third important characteristic is the rate of exchange of the extract component of the feed mixture material, or, in other words, the relative rate of desorption of the extract component. This characteristic relates directly to the amount of desorbent material that must be employed in the process to recover the extract component from the adsorbent; faster rates of exchange reduce the amount of desorbent material needed to remove the extract component and therefore permit a reduction in the operating cost of the process. With faster rates of exchange, less desorbent material has to be pumped through the process and separated from the extract stream for reuse in the process.

Adsorbents to be used in the process of this invention will comprise specific crystalline aluminosilicates or molecular sieves. Particular crystalline aluminosilicates encompassed by the present invention include crystalline aluminosilicate cage structures in which the alumina and silica tetrahedra are intimately connected in an open three dimensional network to form cage-like structures with window-like pores of about 8 Å free diameter. The tetrahedra are cross-linked by the sharing or oxygen atoms with spaces between the tetrahedra occupied by water molecules prior to partial or total dehydration of this zeolite. The dehydration of the zeolite results in crystals interlaced with cells having molecular dimensions and thus the crystalline aluminosilicates are often referred to as "molecular sieves", particularly when the separation which they effect is dependent essentially upon differences between the sizes of the feed molecules as, for instance, when smaller normal paraffin molecules are separated from larger isoparaffin molecules by using a particular molecular sieve.

In hydrated form, the crystalline aluminosilicates used in the process of our invention generally encompass those zeolites represented by the Formula 1 below:

Formula 1

$$M_{2/n}O:Al_2O_3:wSiO_2:yH_2O$$

where "M" is a cation which balances the electrovalence of the aluminum-centered tetrahedra and which is generally referred to as an exchangeable cationic site, "n" represents the valence of the cation, "w" represents the moles of $SiO_2$, and "y" represents the moles of water. The generalized cation "M" may be monovalent, divalent or trivalent or mixtures thereof.

The prior art has generally recognized that adsorbents comprising X and Y zeolites can be used in certain adsorptive separation processes. These zeolites are described and defined in U.S. Pat. Nos. 2,882,244 and 3,130,007, respectively incorporated herein by reference thereto. The X zeolite in the hyrated or partially hydrated form can be represented in terms of mole oxides as shown in Formula 2 below:

Formula 2

$$(0.9\pm0.2)M_{2/n}O:Al_2O_3:(2.50\pm0.5)SiO_2:yH_2O$$

where "M" represents at least one cation having a valence of not more than 3, "n" represents the valence of "M", and "y" is a value up to about 9 depending upon the identity of "M" and the degree of hydration of the crystal. As noted from Formula 2, the $SiO_2/Al_2O_3$ mole ratio of X zeolite is 2.5±0.5. The cation "M" may be one or more of a number of cations such as hydrogen cation, an alkali metal cation, or an alkaline earth cation, or other selected cations, and is generally referred to as an exchangeable cationic site. As the X zeolite is initially prepared, the cation "M" is usually predominately sodium, that is, the major cation at the exchangeable cationic sites is sodium and the zeolite is therefore referred to as a sodium-X zeolite. Depending upon the purity of the reactants used to make the zeolite, other cations mentioned above may be present, however, as impurities. The Y zeolite in the hydrated or partially hydrated form can be similarly represented in terms of mole oxides as in Formula 3 below:

Formula 3

$$(0.9\pm0.2)M_{2/n}O:Al_2O_3:wSiO_2:yH_2O$$

where "M" is at least one cation having a valence not more than 3, "n" represents the valence of "M", "w" is a value greater than about 3 up to about 6, and "y" is a value up to about 9 depending upon the identity of "M" and the degree of hydration of the crystal. The $SiO_2/Al_2O_3$ mole ratio for Y zeolites can thus be from about 3 to about 6. Like the X zeolite, the cation "M" may be one or more of a variety of cations but, as the Y zeolite is initially prepared, the cation "M" is also usually predominately sodium. A Y zeolite containing predominately sodium cations at the exchangeable cationic sites is therefore referred to as a sodium-Y zeolite.

Cations occupying exchangeable cationic sites in the zeolite may be replaced with other cations by ion exchange methods well-known to those having ordinary skill in the field of crystalline aluminosilicates. Such methods are generally performed by contacting the zeolite or an adsorbent material containing the zeolite with an aqueous solution of the soluble salt of the cation or cations desired to be placed upon the zeolite. After the desired degree of exchange takes place, the sieves are removed from the aqueous solution, washed, and dried to a desired water content. By such methods the sodium cations and any non-sodium cations which might be occupying exchangeable sites as impurities in a sodium-X or sodium-Y zeolite can be partially or essentially completely replaced with other cations. It is peferred that the zeolite used in the process of my invention contain cations at exchangeable cationic sites selected from the group consisting of the alkali metals and the alkaline earth metals.

Typically, adsorbents known to the prior art used in separative processes contain zeolite crystals dispersed in an amorphous material or inorganic matrix. The zeolite will typically be present in the adsorbent in amounts ranging from about 75 wt. % to about 98 wt. % based on volatile free composition. Volatile free compositions are generally determined after the adsorbent has been calcined at 900° C. in order to drive off all volatile matter. The remainder of the adsorbent will generally be the inorganic matrix material such as silica, titania, or alumina or mixtures thereof, or compounds, such as clays, which material is present in intimate mixture with the small particles of the zeolite material. This matrix material may be an adjunct of the manufacturing process for zeolite (for example, intentionally incomplete purification of either zeolite during its manufacture) or it may be added to relatively pure zeolite, but in either case its usual purpose is as a binder to aid in forming or agglomerating the hard crystalline particles of the zeolite. Normally, the adsorbent will be in the form of particles such as extrudates, aggregates, tablets, macrospheres or granules having a desired particle size range. The typical adsorbent will have a particle size range of about 16–60 mesh (Standard U.S. Mesh). Examples of zeolites used in adsorbents known to the art, either as is or after cation exchange, are "Molecular Sieves 13X" and "SK-40" both of which are available from the Linde Company, Tonawanda, N.Y. The first material of course contains X zeolite while the latter material contains Y zeolite. It is known that X or Y zeolites possess the selectivity requirement and other necessary requirements previously and are therefore suitable for use in separation processes.

The adsorbent of our invention comprises the known art adsorbent coated with cellulose ether. We have previously found cellulose nitrate, cellulose esters such as cellulose acetate and/or cellulose acetate butyrate to be particularly suitable for use as adsorbent coating materials. We believe, however, that cellulose ethers, and particularly ethylcellulose, are even more suitable for such use because of the known superior resistance to hydrolysis of cellulose ethers as compared to cellulose esters. The preferred concentration of the cellulose ether coating on the adsorbent is from about 1.0 to about 4.0 wt. %.

Like some of the above discussed adsorbents of the known art, the adsorbent of our invention is in the form of particles having a particle size range of about 16–80 mesh (Standard U.S. Mesh). Unlike the known art adsorbents, however, the adsorbent of our invention achieves substantially reduced disintegration and silicon contamination of the product stream when used in the process of our invention. The reduced disintegration results in minimization of the undesirable increase in pressure drop through the column in which the adsorbent is packed as compared to the inevitable high increase associated with the adsorbents of the known art.

The adsorbent of our invention is manufactured by dissolving the water insoluble cellulose ether in a liquid organic solvent to form a solution, adding the uncoated precursor of the adsorbent to the solution to form an adsorbent slurry, and removing the solvent from the adsorbent slurry to obtain the adsorbent. After the adsorbent slurry is made and before the solvent is removed we have found it advantageous to take steps to ensure thorough permeation of the pores of the adsorbent by the solution. Preferred examples of such steps are to age the slurry for at least one hour, or to expose the slurry to a partial vacuum of from about 100 to about 500 mm Hg for not greater than about 30 minutes. The aging or vacuum treatment we assume enables the solution to displace the air in the pores. Preferred liquid organic solvents are p-dioxane, methyl-ethyl ketone, acetone, chloroform, benzyl alcohol, acetic acid, ethyl acetate, toluene and cyclohexanone, any of which may be mixed with formamide. The solvent is removed from the adsorbent preferably by drying at room temperature. The adsorbent particles may be further treated to effect ion exchange between cations at exchangeable cation sites on the crystalline aluminosilicate in the particles and cations preferably selected from the group consisting of alkali metals and alkaline earth metals. Alternatively, the cation exchange in the crystalline aluminosilicate may be effected with the adsorbent precursor prior to the coating in accordance with our invention.

Although it was once thought that merely coating a conventional clay bound adsorbent with an organic polymer such as cellulose ether would not result in an improved adsorbent, the advantageous effects of the adsorbent of our invention are realized by such coating. We have found our invention to be particularly useful for treating used conventional adsorbent, for example, adsorbent taken from a commercial plant for the separation of sugar isomers in an aqueous system. We have noted a vast improvement in the attrition resistance of this used adsorbent when treated in accordance with our invention.

The adsorbent may be employed in the form of a dense compact fixed bed which is alternatively contacted with the feed mixture and desorbent materials. In the simplest embodiment of the invention, the adsorbent is employed in the form of a single static bed in which case the process is only semi-continuous. In another embodiment, a set of two or more static beds may be employed in fixed bed containing with appropriate valving so that the feed mixture is passes through one or more adsorbent beds while the desorbent materials can be passed through one or more of the other beds in the set. The flow of feed mixture and desorbent materials may be either up or down through the desorbent. Any of the conventional apparatus employed in static bed fluid-solid contacting may be used.

Countercurrent moving bed or simulated moving bed countercurrent flow systems, however, have a much greater separation efficiency than fixed adsorbent bed systems and are therefore preferred for use in our separation process. In the moving or simulated moving bed processes the adsorption and desorption operations are continuously taking place which allows both continuous production of an extract and a raffinate stream and the continual use of feed and desorbent streams. One preferred embodiment of this process utilizes what is known in the art as the simulated moving bed countercurrent flow system. The operating principles and sequence of such a flow system are described in U.S. Pat. No. 2,985,589 incorporated herein by reference thereto. In such a system, it is the progressive movement of multiple liquid access points down an adsorbent chamber that simulates the upward movement of adsorbent contained in the chamber. Only four of the access lines are active at any one time; the feed input stream, desorbent inlet stream, raffinate outlet stream, and extract outlet stream access lines. Coincident with this simulated upward movement of the solid adsorbent is the movement of the liquid occupying the void volume of the packed bed of adsorbent. So that countercurrent contact is maintained, a liquid flow down the adsorbent chamber may be provided by a pump. As an active liquid access point moves through a cycle, that is, from the top of the chamber to the bottom, the chamber circulation pump moves through different zones which require different flow rates. A programmed flow controller may be provided to set and regulate these flow rates.

The active liquid access points effectively divided the adsorbent chamber into separate zones, each of which has a different function. In this embodiment of our process, it is generally necessary that three separate operational zones be present in order for the process to take place although in some instances an optional fourth zone may be used.

The adsorption zone, zone 1, is defined as the adsorbent located between the feed inlet stream and the raffinate outlet stream. In this zone, the feedstock contacts the adsorbent, an extract component is adsorbed, and a raffinate stream is withdrawn. Since the general flow through zone 1 is from the feed stream which passes into the zone to the raffinate stream which passes out of the zone, the flow in this zone is considered to be downstream direction when proceeding from the feed inlet to the raffinate outlet streams.

Immediately upstream with respect to fluid flow in zone 1 is the purification zone, zone 2. The purification zone is defined as the adsorbent between the extract outlet stream and the feed inlet stream. The basic operations taking place in zone 2 are the displacement from the non-selective void volume of the adsorbent of any raffinate material carried into zone 2 by the shifting of adsorbent into this zone and the desorption of any raffinate material adsorbed within the selective pore volume of the adsorbent or adsorbed on the surfaces of the adsorbent particles. Purification is achieved by passing a portion of extract stream material leaving zone 3 into zone 2 at zone 2's upstream boundary, the extract outlet stream, to effect the displacement of raffinate material. The flow of material in zone 2 is in a downstream direction from the extract outlet stream to the feed inlet stream.

Immediately upstream of zone 2 with respect to the fluid flowing in zone 2 is the desorption zone, or zone 3. The desorption zone is defined as the adsorbent between the desorbent inlet and the extract outlet stream. The function of the desorption zone is to allow a desorbent material which passes into this zone to displace the extract component which was adsorbed upon the adsorbent during a previous contact with feed in zone 1 in a prior cycle of operation. The flow of fluid in zone 3 is essentially in the same direction as that of zones 1 and 2.

In some instances, an optional buffer zone, zone 4, may be utilized. This zone, defined as the adsorbent between the raffinate outlet stream and the desorbent inlet stream, if used, is located immediately upstream with respect to the fluid flow to zone 3. Zone 4 would be utilized to conserve the amount of desorbent utilized in the desorption step since a portion of the raffinate stream which is removed from zone 1 can be passed into zone 4 to displace desorbent material present in that zone out of that zone into the desorption zone. Zone 4 will contain enough adsorbent so that raffinate material present in the raffinate stream passing out of zone 1 and into zone 4 can be prevented from passing into zone 3, thereby contaminating the extract stream removed from zone 3. In the instances in which the fourth operational zone is not utilized, the raffinate stream passed from zone 1 to zone 4 must be carefully monitored in order that the flow directly from zone 1 to zone 3 can be stopped when there is an appreciable quantity of raffinate material present in the raffinate stream passing from zone 1 into zone 3 so that the extract outlet stream is not contaminated.

A cyclic advancement of the input and output streams through the fixed bed of adsorbent can be accomplished by utilizing a manifold system in which the valves in the manifold are operated in a sequential manner to effect the shifting of the input and output streams, thereby allowing a flow of fluid with respect to solid adsorbent in a countercurrent manner. Another mode of operation which can effect the countercurrent flow of solid adsorbent with respect to fluid involves the use of a rotating disc valve in which the input and output streams are connected to the valve and the lines through which feed input, extract output, desorbent input and raffinate output streams pass are advanced in the same direction through the adsorbent bed. Both the manifold arrangement and disc valve are known in the art. Specifically, rotary disc valves which can be utilized in this operation can be found in U.S. Pat. Nos. 3,040,777 and 3,422,848. Both of the aforementioned patents disclose a rotary type connection valve in which the suitable advancement of the various input and output streams from fixed sources can be achieved without difficulty.

In many instances, one operational zone will contain a much larger quantity of adsorbent than some other operational zone. For instance, in some operations the buffer zone can contain a minor amount of adsorbent as compared to the adsorbent required for the adsorption and purification zones. It can also be seen that in instances in which desorbent is used which can easily desorb extract material from the adsorbent that a relatively small amount of adsorbent will be needed in a desorption zone as compared to the adsorbent needed in the buffer zone or adsorption zone or purification zone or all of them. Since it is not required that the adsorbent be located in a single column, the use of multiple chambers or a series of columns is within the scope of the invention.

It is not necessary that all of the input or output streams be simultaneously used, and in fact, in many instances some of the streams can be shut off while others effect an input or output of material. The apparatus which can be utilized to effect the process of this invention can also contain a series of individual beds connected by connecting conduits upon which are placed input or output taps to which the various input or output streams can be attached and alternatively and periodically shifted to effect continuous operation. In some instances, the connecting conduits can be connected to transfer taps which during the normal operations do not function as a conduit through which material passes into or out of the process.

It is contemplated that at least a portion of the extract output stream will pass into a separation means wherein at least a portion of the desorbent material can be separated to produce an extract product containing a reduced concentration of desorbent material. Preferably, but not necessary to the operation of the process, at least a portion of the raffinate output stream will also be passed to a separation means wherein at least a portion of the desorbent material can be separated to produce a desorbent stream which can be reused in the process and a raffinate product containing a reduced concentration of desorbent material. The separation means will typically be a fractionation column or an evaporator, the design and operation of either being well-known to the separation art.

Reference can be made to D. B. Broughton U.S. Pat. No. 2,985,589, and to a paper entitled "Continuous Adsorptive Processing-A New Separation Technique" by D. B. Broughton presented at the 34th Annual Meeting of the Society of Chemical Engineers at Tokyo, Japan, on Apr. 2, 1969 (both of which are incorporated herein by reference), for further explanation of the simulated moving bed countercurrent process flow scheme.

A dynamic testing apparatus is employed to test various adsorbents with a particular feed mixture and desorbent material to measure the adsorbent characteristics of adsorptive capacity, selectivity and exchange rate. The apparatus consists of an adsorbent chamber of approximately 70 cc volume having inlet and outlet portions at opposite ends of the chamber. The chamber is contained within a temperature control means and, in addition, pressure control equipment is used to operate the chamber at a constant predetermined pressure. Quantitative and qualitative analytical equipment such as refractometers, polarimeters and chromatographs can be attached to the outlet line of the chamber and used to detect quantitatively or determine qualitatively one or more components in the effluent stream leaving the adsorbent chamber. A pulse test, performed using this apparatus and the following general procedure, is used to determine selectivities and other data for various adsorbent systems. The adsorbent is filled to equilibrium with a particular desorbent material by passing the desorbent material through the adsorbent chamber. At a convenient time, a pulse of feed containing known concentrations of a tracer and of a particular ketose or aldose or both all diluted in desorbent is injected for a duration of several minutes. Desorbent flow is resumed, and the tracer and the ketose and aldose are eluted as in a liquid-solid chromatographic operation. The effluent can be analyzed on-stream or alternatively effluent samples can be collected periodically and later analyzed separately by analytical equipment and traces of the envelopes of corresponding component peaks developed.

From information derived from the test adsorbent, performance can be rated in terms of void volume, retention volume for an extract or a raffinate component, selectively for one component with respect to the other, the rate of desorption of an extract component by the desorbent and the extent of silica contamination of the extract and raffinate stream. The retention volume of an extract or a raffinate component may be characterized by the distance between the center of the peak envelope of an extract or a raffinate component and the peak envelope of the tracer component of some other known reference point. It is expressed in terms of the volume in cubic centimeters of desorbent pumped this time interval represented by the distance between the peak envelope. Selectivity (B), for an extract component with respect to a raffinate component may be characterized by the ratio of the distance between the center of the extract component peak envelope and the tracer peak envelope. The rate of exchange of an extract component with the desorbent can generally be characterized by the width of the peak envelopes at half intensity. The narrower the peak width the faster the desorption rate.

To further evaluate promising adsorbent systems and to translate this type of data into a practical separation process requires actual testing of the best system in a continuous countercurrent moving bed or simulated moving bed liquid-solid contacting device. The general operating principles of such a device are as described hereinabove. A specific laboratory size apparatus utilizing these principles is described in deRosset et al U.S. Pat. No. 3,706,812. The equipment comprises multiple adsorbent beds with a number of access lines attached to distributors within the beds and terminating at a rotary distributing valve. At a given position, feed and desorbent are being introduced through two of the lines and the raffinate and extract streams are being withdrawn through two more. All remaining access lines are inactive and when the position of the distributing valve is advanced by one index all active positions will be advanced by one bed. This simulates a condition in which the adsorbent physically moves in a direction countercurrent to the liquid flow. Additional details on the above-mentioned adsorbent testing apparatus and adsorbent evaluation techniques may be found in the paper "Separation of $C_8$ Aromatics by Adsorption" by A. J. deRosset, R. W. Neuzil, D. J. Korous, and D. H. Rosback presented at the American Chemical Society, Los Angeles, Cal., Mar. 28 through Apr. 2, 1971.

Although both liquid and vapor phase operations can be used in many adsorptive separation processes, liquid-phase operation is required for this process because of the lower temperature requirements and because of the higher yields of extract product that can be obtained with liquid phase-operation over those obtained with vapor-phase operation. Adsorption conditions will include a temperature range of from about 20° C. to about 200° C. with about 20° C. to about 100° C. being more preferred and a pressure range of from about atmospheric to about 500 psig with from about atmospheric to about 250 psig being more preferred to insure liquid phase. Desorption conditions will include the same range of temperatures and pressures as used for adsorption conditions.

The size of the units which can utilize the process of this invention can vary anywhere from those of pilot plant scale (see for example our assignee's U.S. Pat. No. 3,706,812) to those of commercial scale and can range in flow rates from as little as a few cc an hour up to many thousands of gallons per hour.

The following examples are presented to illustrate our invention and are not intended to unduly restrict the scope and spirit of the claims attached hereto.

EXAMPLE I

The purpose of this example is to illustrate the method of manufacture of adsorbents of our invention. One sample was prepared by the following steps:
(1) Ethyl cellulose powder was dissolved in methylethylketone to obtain a solution of about 3 wt.% ethylcellulose.
(2) A fresh clay bound Ca-Y faujasite adsorbent was added to the solution in sufficient quantity so that the ethylcellulose comprised from about 2 to 3 wt.% of the adsorbent plus the ethylcellulose on a dry basis.
(3) The resultant slurry was aged for two hours.
(4) The methylethylketone was evaporated off at room temperature to obtain a sample of the adsorbent of our invention referred to as Sample #1.

Two more samples of adsorbent of our invention referred to as Samples #2 and #3, were prepared in a manner identical to that for Sample #1 except that in both cases the slurry was exposed to a partial vacuum rather than being aged, and, with regard to Sample #3, the clay bound Ca-Y faujasite had been used for 15 months in a commercial plant for the separation of fructose from invert sugar.

EXAMPLE II

The purpose of this example is to present the results of tests of each of the adsorbents, prepared as set forth in the above Example I, in the dynamic testing apparatus hereinbefore described, as well as various fresh and used, coated and uncoated, conventional clay bound Ca-Y faujasite adsorbents not coated in accordance with the present invention (Sample Nos. 4 through 7), to determine the performance of each such adsorbent with regard to the adsorptive separation of the individual components of an aqueous solution of a mixture of components.

The general pulse-test apparatus and procedure used to determine the performance of each such adsorbent with regard to the adsorptive separation of the individual components of an aqueous solution of a mixture of components was the previously described dynamic testing apparatus.

The adsorbents were tested in a straight column 127 cm in length and 0.84 cm in internal diameter which resulted in a test adsorbent bed of 70 cc. The feed consisted of 5 wt.% each of glucose, fructose and sucrose and 20 vol.% of $D_2O$ in water. The water is deionized and had a nominal pH of 7.0. This water was also used as the desorbent.

The desorbent was run continuously through the column at a rate of 1 ml/min. At some convenient time interval, the desorbent was stopped and the feed which was also run at the rate of 1 ml/min. was pumped for a period of 10 min. to deliver a 10 ml "pulse". Immediately after the feed pulse was completed the desorbent flow was resumed and two minute samples of the effluent were collected.

The sample collection was carried out with an automatic sample collector and later each sample was sequentially injected into a HPLC for analysis. From the analysis of these fractions a chromatograph of the separation of the feed components that were present in the feed pulse was constructed. This was accomplished by plotting the peak height of each component versus the volume of effluent represented by the fraction from which the measurements were made. By joining the respective peak heights of each component, peak envelopes of the components were obtained. The composite pilot resembles a chromatogram of component peaks obtained from an analytical HPLC of poor resolving power.

Thus, for each adsorbent tested four peak envelopes were constructed, one for glucose, one for fructose, one for deuterium oxide and one for sucrose. The retention volume for glucose was calculated by measuring the distance from time zero or the reference point to the midpoint of the glucose peak and subtracting the distance representing the void volume of the adsorbent obtained by measuring distance from the same reference point to the midpoint of the sucrose peak. In a similar manner retention volumes for fructose and deuterium oxide were obtained. The selectivities of an adsorbent for fructose with respect to glucose and for fructose with respect to water are the quotients obtained by dividing the fructose retention volume by the glucose retention volume and by dividing the fructose retention by the deuterium oxide retention volume respectively. The results for these pulse tests are given in Table I.

TABLE I

| Sample No. | Pulse Tests | | | | | | |
|---|---|---|---|---|---|---|---|
| | 1 | 2 | 3 | 4 | 5 | 6 | 7 |
| Half Widths | | | | | | | |
| Fructose | 19.3 | 18.41 | 17.0 | 14.2 | 13.8 | 15.5 | 14.5 |
| Glucose | 14.0 | 14.00 | 13.3 | 12.0 | 12.7 | 14.3 | 12.5 |
| Sucrose | 15.5 | 14.79 | 14.3 | 12.6 | 14.2 | 18.4 | 13.5 |
| $D_2O$ | 9.15 | 10.14 | 9.31 | 10.2 | 9.9 | 10.1 | 10.5 |

TABLE I-continued

| Sample No. | Pulse Tests | | | | | | |
|---|---|---|---|---|---|---|---|
| | 1 | 2 | 3 | 4 | 5 | 6 | 7 |
| Retention Volumes | | | | | | | |
| Fructose | 12.5 | 12.13 | 12.5 | 13.2 | 12.3 | 8.3 | 13.6 |
| Glucose | 2.46 | 2.18 | 2.43 | 2.4 | 2.4 | 0.9 | 2.5 |
| $D_2O$ | 13.2 | 12.79 | 13.9 | 12.8 | 12.6 | 9.3 | 13.0 |
| B | | | | | | | |
| F/G | 5.08 | 5.57 | 5.14 | 5.5 | 5.2 | 9.3 | 5.1 |
| F/$D_2O$ | 0.95 | 0.95 | 0.90 | 1.0 | 1.0 | 0.9 | 1.1 |
| Attrition | | | | | | | |
| Through 50 mesh | 2.1 | 1.8 | 2.6 | 6.2 | 17.1 | 2.2 | 1.8 |
| Through 60 mesh | 1.0 | 1.1 | 1.2 | 4.6 | 10.4 | 1.3 | 0.8 |

COMMENTS
Sample 1 = 2.6% Ethylcellulose coated ADS-100.
Sample 2 = 2.5% Ethylcellulose coated ADS-100 by partial vacuum.
Sample 3 = 2.6% Ethylcellulose coated used ADS-100 by partial vacuum.
Sample 4 = Sarex adsorbent clay binder.
Sample 5 = Sarex adsorbent from a commercial plant after 15 months of operation.
Sample 6 = 2% cellulose acetate coated ADS-100.
Sample 7 = 2% cellulose acetate butyrate coated used ADS-100 by partial vacuum.

It is apparent from the test data of Table I that the performance of the adsorbents of our invention, with regard to adsorption of components from an aqueous system, does not substantially differ from the conventional fresh or used clay bound adsorbents, nor from the cellulose ester coated adsorbents. That observation, taken in the light of the known fact that cellulose ethers are more resistant to hydrolysis than cellulose esters, establishes the superiority of the adsorbent of our invention.

We claim as our invention:

1. An adsorbent comprising both a crystalline aluminosilicate and an inorganic matrix wherein said crystalline aluminosilicate is dispersed in said inorganic matrix, said adsorbent suitable for use in a process for the separation of a component from a feed mixture comprising an aqueous solution of a mixture of components by contacting said solution with said adsorbent, said adsorbent exhibiting an adsorptive selectivity towards said component, said adsorbent being coated with a cellulose ether to substantially reduce the disintegration of said adsorbent.

2. The adsorbent of claim 1 further characterized in that said cellulose ether comprises ethylcellulose.

3. The adsorbent of claim 1 further characterized in that said crystalline aluminosilicate is selected from the group consisting of X zeolites and Y zeolites.

4. The adsorbent of claim 3 further characterized in that said crystalline aluminosilicate contains cations at exchangeable cationic sites selected from the group consisting of alkali metals and alkaline earth metals.

5. The adsorbent of claim 1 further characterized in that said cellulose ether comprises from about 1.0 wt.% to about 4.0 wt. % of said adsorbent.

6. The adsorbent of claim 1 further characterized in that said inorganic matrix comprises silica, alumina, titania or natural clay.

7. A method for the manufacture of an adsorbent comprising both a crystalline aluminosilicate and an inorganic matrix wherein said crystalline aluminosilicate is dispersed in said inorganic matrix, and wherein said adsorbent is coated with a cellulose ether, said adsorbent being suitable for use in a process for the separation of a component from a feed mixture comprising an aqueous solution of a mixture of components, which method comprises:

(a) dissolving said cellulose ether in a liquid organic solvent to form a solution;

(b) adding the uncoated precursor of said adsorbent to said solution to form an adsorbent slurry; and (c) removing said solvent from said adsorbent slurry to obtain said adsorbent.

8. The method of claim 7 further characterized in that said adsorbent slurry, following its preparation in accordance with step (b), but prior to the removal of solvent in accordance with step (c), is aged for at least 1 hour.

9. The method of claim 7 further characterized in that said adsorbent slurry, following its preparation in accordance with step (b), but prior to the removal of solvent in accordance with step (c), is exposed to a partial vacuum of from about 100 to about 500 mm Hg for not greater than about 30 minutes.

10. The method of claim 7 further characterized in that in step (c) said solvent is removed from said adsorbent slurry by drying at room temperature.

11. The method of claim 7 further characterized in that said cellulose ether comprises ethylcellulose.

12. The method of claim 11 further characterized in that the concentration of said ethylcellulose in said solution is from about 1.0 wt. % to about 5.0 wt. %.

13. The method of claim 12 further characterized in that the amount of solution used relative to the amount of said uncoated precursor added is sufficient to impart a concentration of ethylcellulose coating to adsorbent of from about 1.0 wt. % to about 4.0 wt. % on a dry basis.

14. The method of claim 7 further characterized in that said crystalline aluminosilicate is selected from the group consisting of X zeolites and Y zeolites.

15. The method of claim 14 further characterized in that cations at exchangeable cationic sites on said crystalline aluminosilicate in said particles are exchanged with cations selected from the group consisting of alkali metals and alkaline earth metals.

* * * * *